Feb. 1, 1938.  J. M. DAVAN  2,107,107
TRAILER
Filed May 28, 1937  4 Sheets-Sheet 1
Inventor
J. M. Davan
By Clarence A. O'Brien
Hyman Berman
Attorneys
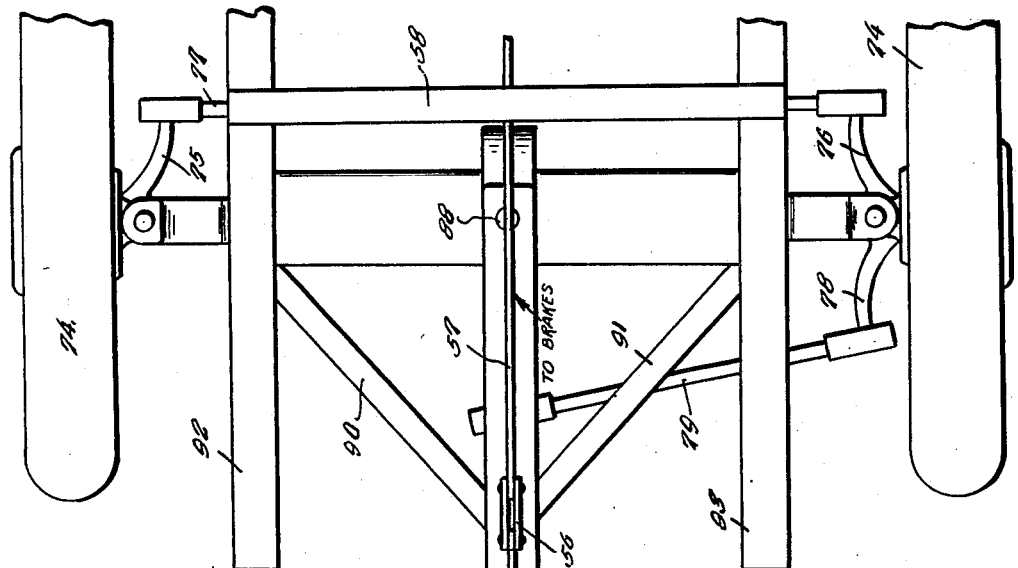
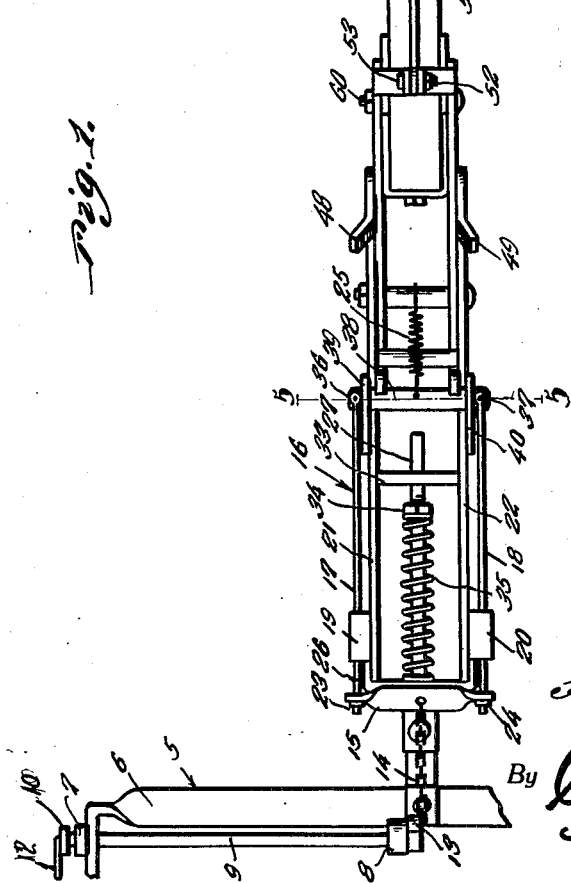

Feb. 1, 1938.   J. M. DAVAN   2,107,107
TRAILER
Filed May 28, 1937   4 Sheets-Sheet 2
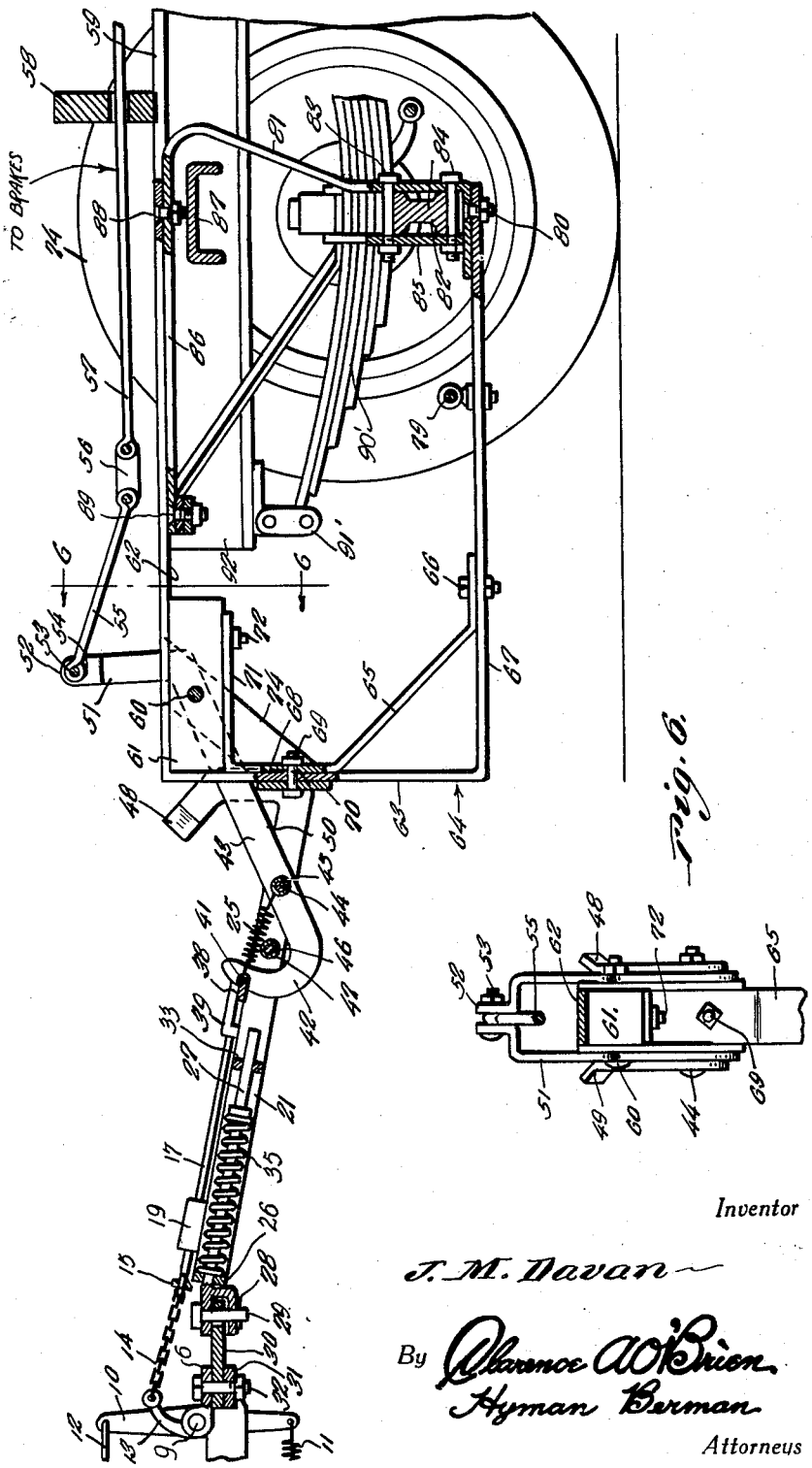
Inventor
J. M. Davan
By Clarence A. O'Brien
Hyman Berman
Attorneys

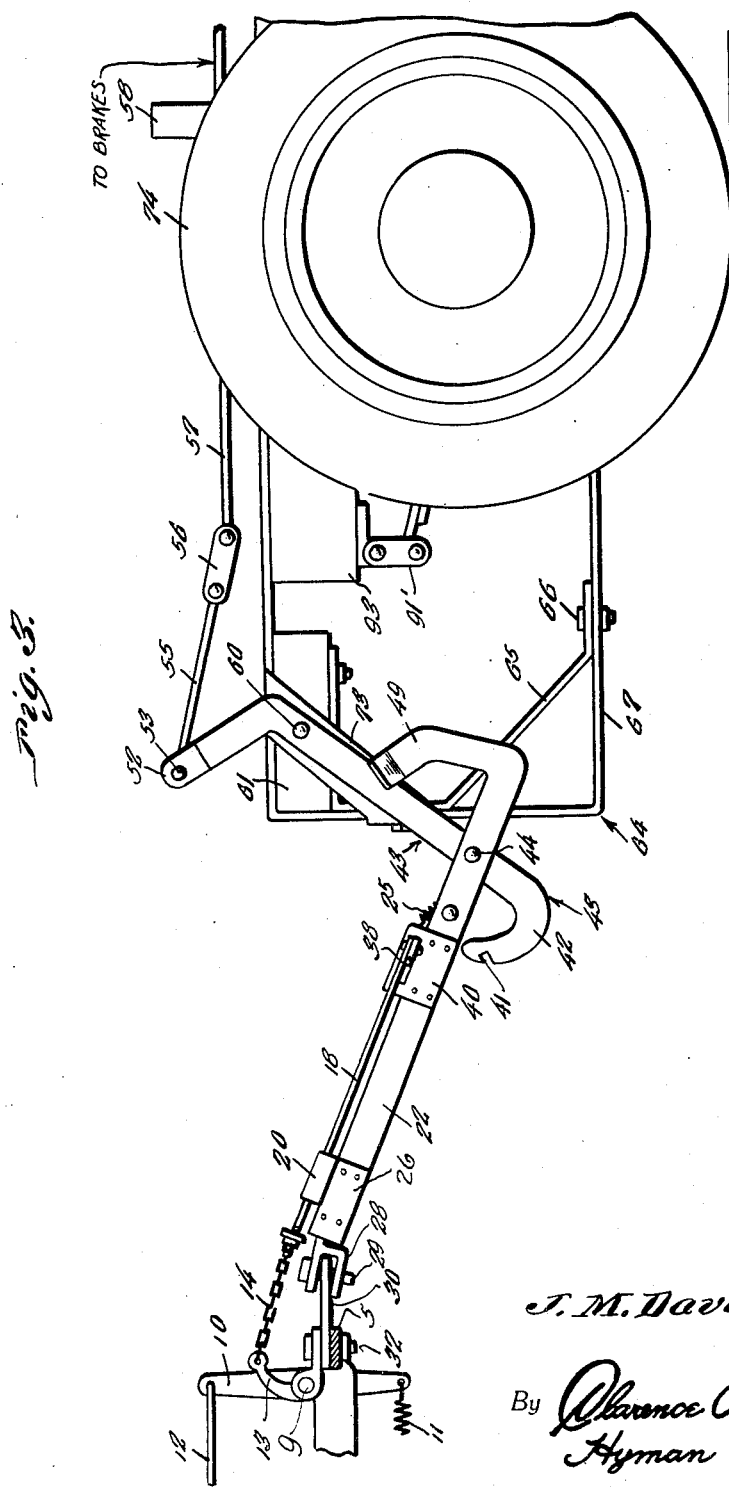

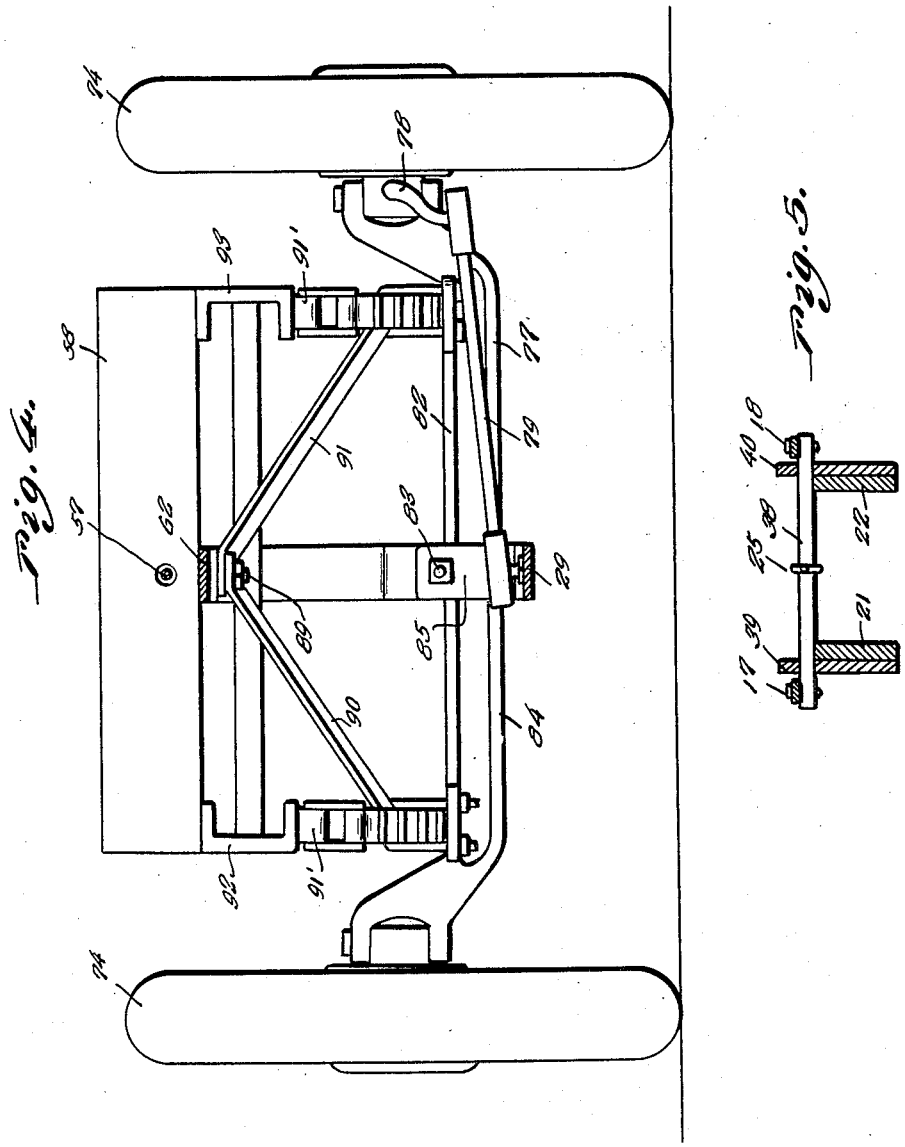

Patented Feb. 1, 1938

2,107,107

UNITED STATES PATENT OFFICE 2,107,107

TRAILER

James M. Davan, Rossville, Ill.

Application May 28, 1937, Serial No. 145,369

4 Claims. (Cl. 188—142)

My invention relates generally to trailers, and particularly to trailers having brake mechanism responsive both to the application of the brakes on the draft vehicle or tractor, and to retardation in the forward motion of the draft vehicle or tractor, and an important object of my invention is to provide a simple and efficient arrangement of this character.

Another important object of my invention is to provide in a tractor and trailer combination of the character indicated above, a trailer hitch which performs the office of draft means for the trailer as well as actuating means for the trailer brake system.

Other important objects of my invention will be apparent from a reading of the following description taken in connection with the drawings, wherein for purposes of illustration I have shown a preferred embodiment of my invention.

In the drawings:—

Figure 1 is a general top plan view showing the forepart of a trailer connected by a combination brake applier and hitch to a tractor.

Figure 2 is a longitudinal sectional view taken through Figure 1.

Figure 3 is a side elevational view of Figure 1.

Figure 4 is a transverse vertical sectional view taken through Figure 1.

Figure 5 is a transverse vertical sectional view taken through Figure 1 showing a detail of the hitch.

Figure 6 is a transverse vertical sectional view taken through Figure 2 approximately on the line 6—6 and looking toward the left in the direction of the arrows.

Referring in detail to the drawings, the numeral 5 generally designates the draft vehicle or tractor which comprises a rear cross member 6 on which are mounted bearings 7 and 8 mounting a rotary transverse shaft 9 which has on its outward end a duplex brake lever 10 which has a retracting spring 11 attached to its lower end and a link 12 attached to its upper end, the said link leading to an operative part of the brake mechanism (not shown) of the tractor. The opposite end of the shaft 9 has thereon an arm 13 to which is attached the front end of a chain 14 whose rear end is attached to the cross member 15 of the latch mechanism of the hitch, the hitch being generally designated 16.

The latch mechanism comprises the longitudinal rods 17 and 18 which slide in tubes 19 and 20 which are fastened to the opposite sides of hitch side members 21 and 22. The front ends of these rods 17 and 18 have thereon nuts 23 and 24 which permit adjusting the length of these rods to adjust the tension on the spring 25 whose function is subsequently described herein.

A U-shaped cross member 26 bridging the front ends of the side members 21 and 22 has slidable therethrough the longitudinally movable shaft 27 which has on its front end the clevis 28 which is pivotally connected by means of a pin 29 to the draft link 30 which is pivotally connected to a clevis 31 by a pin 32 which traverses the clevis 31 and which is fastened to the tractor cross member 6 already alluded to. As indicated in Figure 2 of the drawings the rods 17 and 18 are mounted above the upper edges of the side members 21 and 22. The rear end of the shaft 27 slides through a cross member 33 which extends between the side members 21 and 22, and an adjustable stop 34 on the shaft 27 adjustably compresses the hitch shock absorbing spring 35 which is circumposed on the shaft 27 between the stop 34 and the cross member 26.

The rear ends of the rods 17 and 18 are pivotally connected as indicated by the numerals 36 and 37 to opposite ends of a transversely arranged longitudinally slidable cross member 38 which slides on the upper edges of the side members 21 and 22 under the retainers 39 and 40 which are fastened to the outer sides of the side members 21 and 22.

It will be obvious that when the brake operating lever 10 is pulled forwardly at its upper end in the operation of the brakes of the vehicle, the arm 13 will swing forwardly and pull on the chain 14 so as to draw the rods 17 and 18 and hence the cross member 38 forwardly against the holding action of the spring 25 and pull the cross member 38 out of the notches 41 in the forward edges of the hook portions 42 of the similar levers 43 which are pivoted between the cross members 21 and 22 on the shaft 44 which has thereon a spacer 45 keeping the members 43 properly spaced. In their engaged position the hook portions 42 come up under a cross shaft 46 which connects the rear ends of the side members 21 and 22 and which has thereon a spacer 47 keeping the side members properly spaced and braced. The rear end of the spring 25 is fastened to the shaft 44.

The rear ends of the side members 21 and 22 have upwardly and forwardly and laterally outwardly extending arms 48 and 49 which guide the action of the hook equipped arms 43.

The arms 43 have the hook portions 42 already mentioned and also the straight portions 50 on the rear end of which rise arms 51 which are bent inwardly to provide a clevis formation 52 traversed by a pin 53 which traverses an eye 54 on the front end of a brake link 55 whose rear end is connected by double linkage 56 to the front end of the main brake applying rod 57 which extends rearwardly through the bolt 58 which is mounted on the trailer chassis side members 59. The levers 43 have a pivot 60 pivotally mounting the same on opposite sides of a block 61 which is fastened to the top leg 62 adjacent the bight 63 of a U-shaped frame 64 which is disposed longitudinally and centrally with respect to the trailer chassis frame on the front thereof. A brace 65 is fastened as indicated by the numeral 66 to the lower leg 67 of the frame 64 and a vertical part 68 is bolted as indicated by the numeral 69 to the bight 63 and also to a plate 70. The upper part of the portion 68 has a horizontal rearward extension 71 which is bolted as indicated by the numeral 72 to the bottom of the block 61. The plate 70 has upwardly inclining side extensions 73 and 74 which are traversed by the pivot 60 and which are fastened to the sides of the block 61, these extensions acting as wear plates for the levers 43.

The trailer front wheels 74 are mounted on dirigible spindles having spindle arms 75 and 76 conventionally spaced and connected by a tie rod 77, and the left hand wheel has an additional arm 78 which is connected by a drag link 79 to the lower leg 67 of the frame 64, the rear end of this leg being bolted as indicated by the numeral 80 to the foot portion of a bracket 81, the said foot portion underlying the vehicle axle 82 on which the wheel spindles are mounted, and the said bracket 81 being connected to this axle by means of bolts 83 and 84 which clamp against the front of the axle the plate 85 in opposition to the bracket. The upper part of the bracket has a forward horizontal extension 86 which overlies the chassis cross member 87 and is bolted as indicated by the numeral 88 to the upper leg 62 of the frame 64 and bolted again as indicated by the numeral 89 to the forward ends of the converging braces 90 and 91 which have their lower and rear ends attached to opposite ends of the plate 85.

The axle 82 has mounted thereon in a conventional manner the vehicle springs 90' which are shackled as indicated by the numeral 91' to a front end portion of the chassis side members 92 and 93.

In view of the arrangements provided and described and shown herein, when the tractor 5 is operated in a manner to apply the brakes of the trailer, the lever 10 will swing forwardly and in so doing retract the latch dog 38 from engagement with the notches 41 in the hooked portions of the respective levers 43 so as to leave these levers free to turn on their pivots 60, and permit relative movement on the axis of the shaft 44 between the levers 43, 43 and the hitch frame which is composed of the side members 21 and 22.

Upon the slowing down of the tractor 5 with the latch released as described, the forward pressure of the trailer will cause the hooked ends of the levers 43 to move downwardly relative to the hitch frame so that the initially erect arms 51 on the rear ends of the levers 43 will move forwardly and pull the trailer brake operating rod 57 forwardly and thereby apply the brakes of the trailer. The application of the brakes of the trailer will correspond in force and energy with the resistance of the tractor to the forward motion of the trailer. When the brakes on the tractor are released the spring 25 will restore the latch to a position to be engaged by the notches 41 in the levers 43 as the pull on the hitch frame is restored and the resulting action of the levers 43 is such as to bring the hooks up again into engagement with the dog 38 as shown in Figure 2 of the drawings. The braking position of the levers 43 is shown in Figure 3 of the drawings.

Although I have shown and described herein a preferred embodiment of my invention, it is to be definitely understood that I do not desire to limit the application of the invention thereto, and any change or changes may be made in the materials and in the structure and arrangement of the parts, within the spirit of the invention and the scope of the subjoined claims.

What is claimed is:—

1. In combination, a tractor having a brake system operated lever, a trailer having brake means and an operating member therefor, a hitch connecting said trailer to said tractor, a normally engaged latch on said hitch operatively connected to said brake system operated lever of the tractor, said hitch comprising a first section connected to said tractor, a second section connected to said trailer, pivot means pivotally connecting said sections, said latch normally engaging a portion of said second section and retaining said second section in initial position, and an operating connection between said second section and said operating member of the trailer brake system, said brake system operated lever of the tractor being arranged to operate said latch in a released position upon application of the tractor brake system, said second section being then adapted to be pivoted relative to said first section by the forward momentum of the trailer relative to the tractor in a manner to work said operating member to apply said brake means of the trailer.

2. In combination, a tractor having a brake system operated lever, a trailer having a brake means and an operating member therefor, a hitch connecting said trailer to said tractor, a normally engaged latch on said hitch operatively connected to said brake system operated lever of the tractor, said hitch comprising a first section connected to said tractor, a second section connected to said trailer, pivot means pivotally connecting said sections, said latch normally engaging a portion of said second section and retaining said second section in initial position relative to said first section and relative to the trailer brake means, and an operating connection between said second section and said operating member of the trailer brake system, said brake system operated lever of the tractor being arranged to operate said latch in a released position upon application of the tractor brake system, said second section being then adapted to be pivoted relative to said first section by the forward momentum of the trailer relative to the tractor in a manner to work said operating member to apply said brake means of the trailer, said first section comprising guiding and aligning means for the movement of said second section.

3. In combination, a tractor having a brake system operated lever, a trailer having brake means and an operating member therefor, a hitch connecting said trailer to said tractor, a normally engaged latch on said hitch operatively connected to said operated lever, said hitch comprising a first lever connected to said tractor, a second lever connected to said trailer, pivot means pivotally connecting said levers, said latch normally engaging a portion of said second lever and retaining the same in initial position relative to said first lever and relative to the brake means of the trailer, and an operating connection between said second lever and said operating member, said brake system operated lever being arranged to operate to release said latch upon application of the tractor brake system, said second lever being then adapted to be pivoted relative to said first lever by the forward momentum of the trailer relative to the tractor in a manner to work said operating member to apply said brake means of the trailer.

4. In combination, a tractor having a brake system operated lever, a trailer having brake means and an operating member therefor, a hitch connecting said trailer to said tractor, a normally engaged latch on said hitch operatively connected to said operated lever, said hitch comprising a first section connected to said tractor, a second section connected to said trailer, pivot means pivotally connecting said sections, said latch normally engaging said second section and retaining the same in initial position, and an operating connection between said second section and said operating member, said brake system operated lever being arranged to operate to release said latch upon application of the tractor brake system and said second section being then adapted to be pivoted relative to said first section by the forward momentum of the trailer relative to the tractor in a manner to work said operating member to apply said brake means of the trailer, said trailer having a draft frame on which said second section is mounted, said trailer further having dirigible front wheels, a tie rod connecting the said front wheels, and a drag link operatively connecting said tie rod to said draft frame.

JAMES M. DAVAN.